United States Patent [19]

Gnau, III

[11] Patent Number: 5,330,142

[45] Date of Patent: Jul. 19, 1994

[54] MOBILE SUPPORT FRAME FOR RADIATION DETECTION EQUIPMENT

[75] Inventor: J. Russell Gnau, III, Royal Oak, Mich.

[73] Assignee: Hot-Sci, Inc., Royal Oak, Mich.

[21] Appl. No.: 38,794

[22] Filed: Mar. 29, 1993

[51] Int. Cl.⁵ .................................................. F16L 3/00
[52] U.S. Cl. ...................................... 248/122; 248/129; 250/336.1
[58] Field of Search ............... 248/122, 124, 129, 130, 248/131, 132, 904; 250/336.1, 393, 394; 340/568

[56] References Cited

U.S. PATENT DOCUMENTS

| | | |
|---|---|---|
| 1,632,606 | 6/1927 | King . |
| 2,376,560 | 4/1941 | Smith .................................. 248/165 |
| 2,885,090 | 6/1957 | Forman et al. ...................... 211/175 |
| 3,185,422 | 5/1965 | Spindler ............................. 248/124 |
| 4,658,142 | 4/1987 | Johnson et al. ..................... 250/393 |
| 4,777,367 | 10/1988 | Kawasaki et al. ................ 250/336.1 |
| 4,866,277 | 9/1989 | Johnson et al. ............... 250/336.1 X |
| 5,126,928 | 6/1992 | Hughes ........................... 248/122 X |
| 5,135,706 | 8/1992 | Costes et al. ...................... 376/245 |
| 5,174,531 | 12/1992 | Perakis .............................. 248/124 |
| 5,242,140 | 9/1993 | Ritland .............................. 248/122 |

FOREIGN PATENT DOCUMENTS 897977 2/1961 United Kingdom .

Primary Examiner—Ramon O. Ramirez
Attorney, Agent, or Firm—Reising, Ethington, Barnard, Perry & Milton

[57] ABSTRACT

A mobile support frame for supporting radiation detection equipment used to detect radiation from material passed through the frame including a base structure and at least one support member extending substantially upward from the base with at least one detector mount movably supported along the support member such that the detector mount may be located at a plurality of positions along the support member. A radiation detector probe is operatively mounted on the detector mount. The detector mount is rotatable about an axis perpendicular to the support member such that the radiation detection equipment may be orientated in a plurality of positions about said perpendicular axis to monitor the radioactivity from material passed through the frame.

9 Claims, 2 Drawing Sheets

MOBILE SUPPORT FRAME FOR RADIATION DETECTION EQUIPMENT

BACKGROUND OF THE INVENTION (1) Technical Field

The subject invention is directed toward a support frame for radiation detection equipment employed to aid in consistent detection of radioactivity of material passed through the frame.

(2) Description of The Prior Art

As the world has become more environmentally conscious, manufacturers, hospitals, clinics and other waste producers must now monitor the radioactivity of their waste. Landfill and incinerator operators which receive waste are sometimes not licensed to handle radioactive materials. Should they detect any radioactivity in waste, these operators may reject the waste and the originator may be required to retrieve, sort and reclaim the radioactive materials in the waste. In addition, fines may be imposed by the relevant regulatory agencies. Hospitals and medical waste producers have been particularly vulnerable to these situations.

Although such waste producers may have procedures in place for handling regulated radioactive medical waste, there have been many instances where radioactive materials have by-passed these procedures and have gotten into the normal waste stream. As such, many waste producers have turned to monitoring the radioactivity of their own wastes. Unfortunately, this also requires additional personnel to monitor the waste, typically using hand held survey meters. Waste producers have a difficult time insuring consistency in the procedures for radioactivity inspections necessitating even additional personnel having oversight responsibilities with no guarantee of greater monitoring consistency. The additional labor costs necessary to monitor radioactive wastes in this way makes such costly procedures very unattractive.

The subject invention overcomes these problems in a mobile support frame for radiation detector equipment which requires no active oversight or monitoring of employees and which insures consistency in the procedures for radioactivity inspection in an efficient, cost effective manner.

SUMMARY OF THE INVENTION

The subject invention is directed toward a mobile support frame for supporting radiation detection equipment used to detect radiation from material passed through the frame. The frame includes a base structure and at least one support member extending substantially upward from the base with at least one detector mount movably supported along the support member such that the detector mount may be located at a plurality of positions along the support member. A radiation detector probe is operatively mounted on the detector mount. The detector mount is rotatable about an axis perpendicular to the support member such that the radiation detection equipment may be orientated in a plurality of positions about the perpendicular axis to monitor the radioactivity from material passed through the frame.

In this way, the mobile support frame of the subject invention in conjunction with the radiation detector probes can automatically monitor wastes as they pass the probes with speed and accuracy not possible with hand held survey meters. The frame's fixed geometry and sensitive probes reduce and almost eliminate the reliance on operator skill and interpretation.

BRIEF DESCRIPTION OF THE DRAWINGS

Other advantages of the present invention will be readily appreciated as the same becomes better understood by reference to the following detailed description when considered in connection with the accompanying drawings wherein.

DETAILED DESCRIPTION OF THE PREFERRED EMBODIMENT

Figure 1:
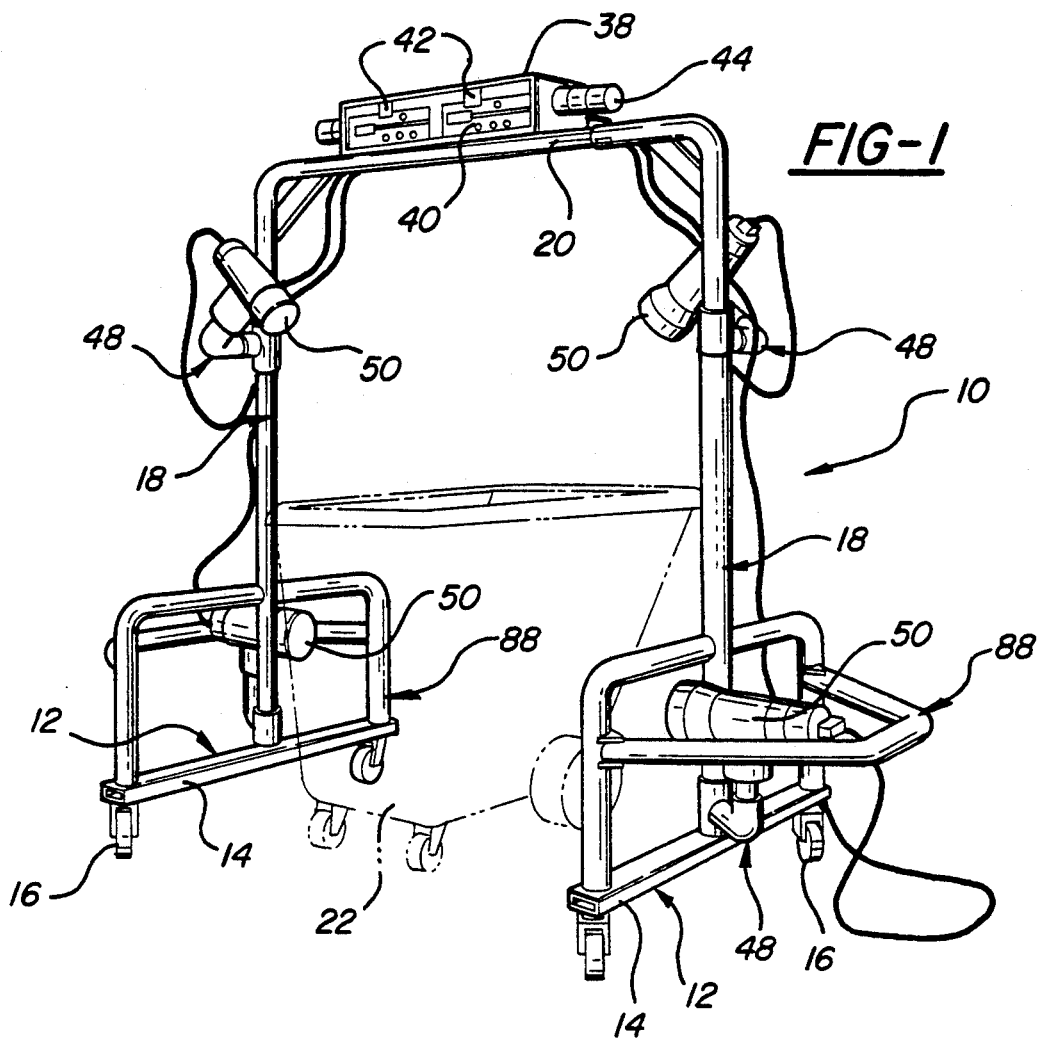
FIG. 1 is a perspective view of the support frame of the subject invention with a waste container in phantom shown passing therethrough.
Figure 2:
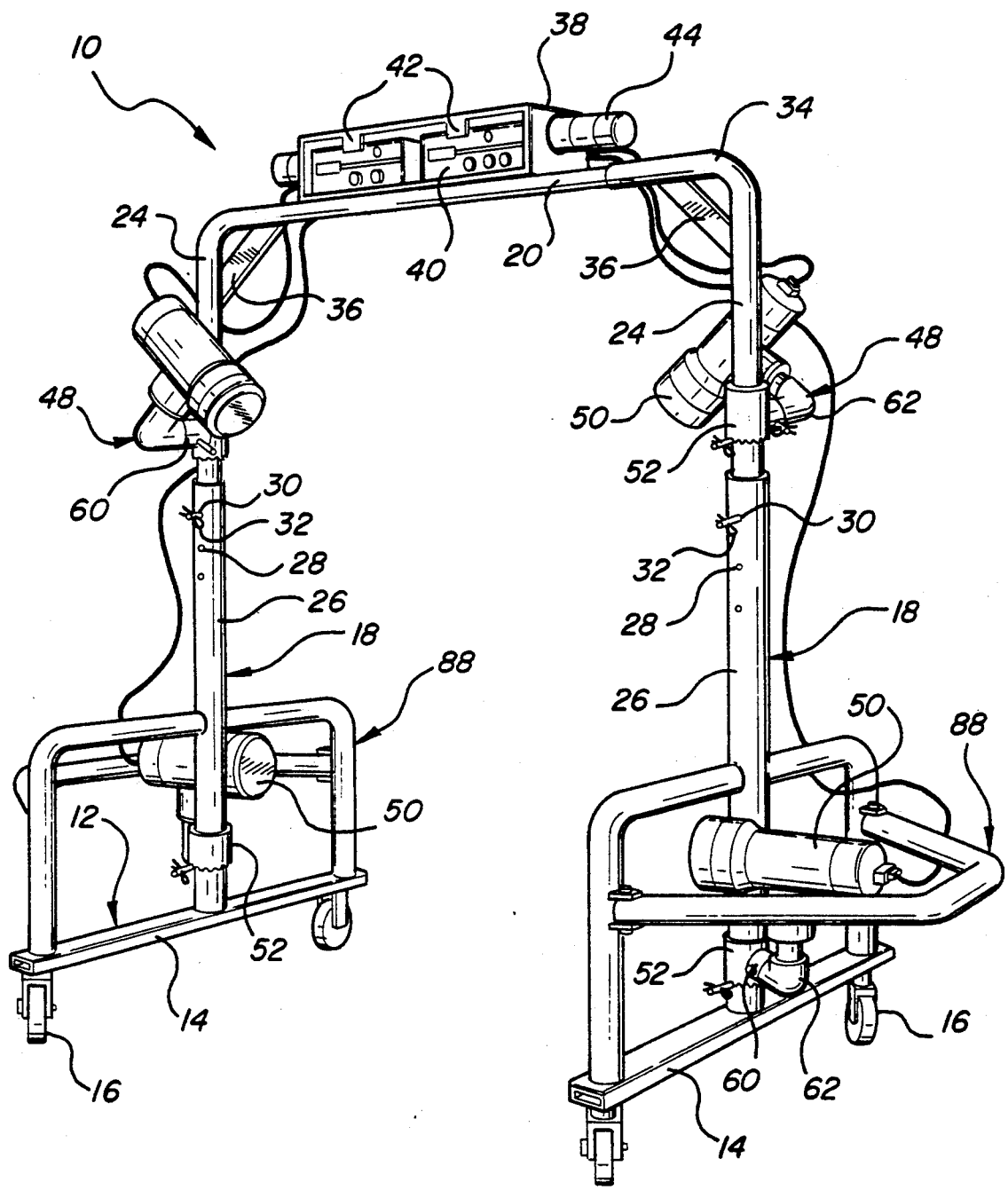
FIG. 2 is another perspective view of the support frame of the subject invention.

A mobile support frame for supporting radiation detection equipment used to detect radiation from material passed through the frame is shown generally at 10 in FIGS. 1 and 2. The frame includes a base structure, generally indicated at 12 including a pair of base members 14 having a pair of castors 16 mounted on each of the base members 14 and adapted for rolling contact with a floor surface such that the support frame 10 may be easily moved.

The frame 10 also includes at least one support member 18 extending substantially upward from the base structure 12 and preferably a pair of support members 18 extending upwardly from the pair of base members 14. The support members 18 are disposed in spaced parallel relationship with respect to one another with a cross-member 20 extending therebetween at the upper margins of the support member 18 opposite the base members 14. The support members 18 are telescopically adjustable such that the height of the mobile support frame 10 may be adjusted. Similarly, the cross member 20 may be telescopically adjusted such that the distance between the support members 18 may be adjusted. More specifically, and referring now to FIG. 2 the support members 18 are made of drawn over mandrel seamless pipe and include upper portions 24 and lower portions 26. The upper and lower portions 24, 26 include corresponding holes 28 which are adapted to receive pins 30 and secured in place with cotters 32. The upper portions 24 are telescopically received in the lower portions 26 such that the overall height of the frame 10 may be adjusted by adjusting the pins 30 in the holes 28. Each of the upper portions 24 have a short transverse portion 34 which extends at a right angle relative to the major part of the support member 18 with a truss 36 interconnecting the transverse portion 34 and the remaining part of the upper portion 24. As with the support member 18, the cross member 20 is made of drawn over mandrel seamless pipe and is telescopically received by at least one of the transverse portions 34 such that the distance between the support members may be adjusted to accommodate waste containers of various widths and heights. In this way, waste containers 22 of the type shown in phantom in FIG. 1 may be quickly and efficiently passed through the frame.

A control box 38 is secured to the cross member 20 for housing radiation monitoring equipment 40. The control box 38 is sealed on five sides with an open sixth side such that the equipment 40 may be inserted into the box 38 and electrically connected to the radiation detection equipment. The monitoring equipment 40 is secured in the box by removable security tabs 42. Alternatively, a clear cover (not shown) may be removably secured over the sixth open side of the box 38 to allow inspection, but not tampering, of the monitoring equipment 40.

The box also includes apertures for accommodating warning lamps 44 electrically connected to the monitoring equipment 40 and designed to signal an alarm when radiation contamination is detected. The box 38 is also adapted to accommodate the necessary electrical connections required for the monitoring equipment 40 as well as the detector equipment but is otherwise designed to limit access to and thereby protect the monitoring equipment 40 from tampering or other interference.

The support frame 10 further includes at least one but preferably a pair of detector mounts 48 movably supported along each support member 18. As such, and in the preferred embodiment shown in FIGS. 1 and 2, there are a pair of detector mounts 48 disposed on the upper portion 24 of the support member 18 and a pair of detector mounts 48 disposed on the lower portion 26 of the support member 18. A radiation detection probe 50 is operatively mounted on each detector mount 48. Each of the detector mounts 48 are movably supported along the support member 18 such that the detector mounts may be located at a plurality of positions along the support member 18 as will be discussed in further detail below.

Figure 3:
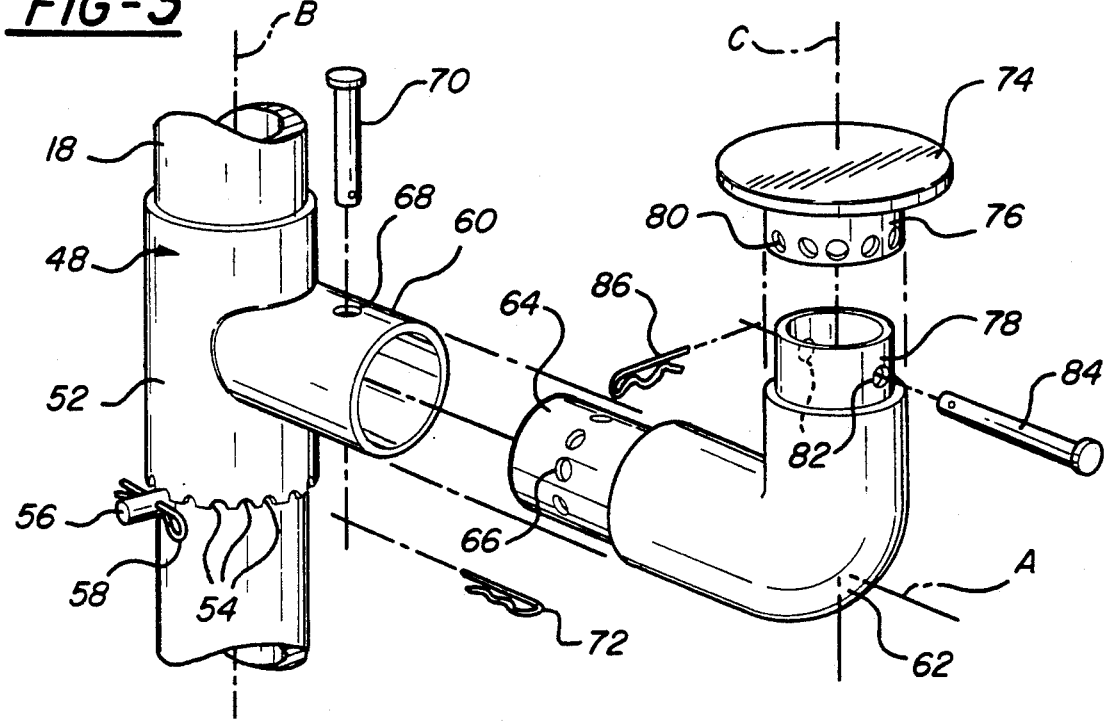
FIG. 3 is an assembly view of the detector mount.

Referring now to FIG. 3, the detector mounts 48 include a collar 52 rotatably and otherwise movably disposed about the support member 18. The collar 52 includes a plurality of arcuate saddle portions 54 adapted to engage locator pins 56 extending through holes in the support member 18 and held in place by cotters 58. The collar 52 are thereby rotatably supported about the support member 18.

The detector mounts 48 also include a short transverse stub 60 extending perpendicular to the collar 52 and thus the support member 18. The transverse stub 60 is adapted to receive an elbow section 62 which has a portion 64 of reduced diameter which fits inside the stub 60. There are a plurality of holes 66 disposed about the periphery of the portion 64 and a pair of aligned apertures 68 located through the stub 60. The holes 66 and apertures 68 are adapted to receive therethrough a pin 70 such that the position of the elbow section 62 may be rotated about an axis perpendicular to the support member 18. The pin 70 is held in place by cotter 72.

The elbow section 62 also includes a platform portion 74 on which is mounted the detector probe 50. The platform portion 74 includes an adaptor 76 which mates with the terminal portion 78 of the elbow 62. As with the reduced diameter portion 64, the adaptor has a plurality of holes 80 disposed therethrough and about its periphery. The terminal portion 78 also includes a pair of aligned apertures 82 located therethrough. The holes 80 and apertures 82 are adapted to receive a pin 84 which may be held in place by cotter 86 such that the position of the platform 74 and therefore the probe 50 may be rotated about an axis disposed in spaced parallel relationship with respect to the support member 18.

In summary, then, the structure of the detector mount 48 described above is rotatable through the elbow 62 about an axis A perpendicular to the support member 18 such that the radiation detector equipment in the form of a probe 50 may be orientated in a plurality of positions about this perpendicular axis. In addition, the collar 52 of the detector mount 48 is rotatable about a second axis B parallel to the support member 18 such that the probe 50 may be oriented in a plurality of positions about this second axis. Finally, the platform portion 74 of the detector mount 48 is rotatable about a third axis C disposed in spaced parallel relationship with respect to the second axis such that the probe 50 may be orientated in a plurality of positions about this third axis.

The mobile support frame 10 of the subject invention is uniquely and specifically designed to provide the flexibility necessary to orientate the probe 50 about three different axes to accommodate a variety of environmental operating conditions and waste handling containers. The flexibility of the frame allows the user to adjust the height and width to accommodate the size of the waste container or other material passed through the frame and then orientate the probes 50 in any manner necessary to accurately detect radioactive materials. Once this configuration has been identified, the geometry of the frame is fixed and is not dependent upon an operators skill or learning. Radiation detection in waste material then essentially becomes a hands off procedure. As waste is passed through the frame, the probes 50 feed information to the monitoring equipment 40 which will sound an alarm if radiation levels exceed an acceptable predetermined amount.

The frame also includes a guard system, generally indicated at 88, which protects the probe 50 mounted in the detector mounts 48 located on the lower portions 26 of the support member 18 from inadvertent contact which would tend to misalign or damage the probes 50.

The subject invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims wherein reference numerals are merely for convenience and are not to be in any way limiting, the invention may be practiced otherwise than as specifically described.

What is claimed is:

1. A mobile support frame for supporting radiation detection equipment used to detect radiation from material passed through said frame, said frame comprising;

a base structure including a pair of base members, a pair of support members extending upwardly from said pair of base members and disposed in spaced parallel relationship with respect to one another with a cross member extending therebetween at the upper margins of said support members opposite said base members and at least one detector mount movably supported along said support members such that said detector mount may be located at a plurality of positions along said support members;

said detector mount being rotatable about an axis perpendicular to said support members such that the radiation detection equipment may be orientated in a plurality of positions about said perpendicular axis to monitor the radioactivity from material passed through said frame.

2. A mobile support frame for supporting radiation detection equipment used to detect radiation from material passed through said frame, said frame comprising;

a base structure including a pair of base members, a pair of support members extending upwardly from said pair of base members and disposed in spaced parallel relationship with respect to one another with a cross member extending therebetween at the upper margins of said support members and at least one detector mount movably supported along said support members such that said detector mount may be located at a plurality of positions along said support members, a radiation detector probe operatively mounted on said detector mount;

said detector mount being rotatable about an axis perpendicular to said support members such that the radiation detection equipment may be oriented in a plurality of positions about said perpendicular axis to monitor the radioactivity from material passed through said frame.

3. A mobile support frame as set forth in either claims 1 or 2 further characterized by said detector mount being rotatable about a second axis parallel to said support member such that the radiation detection equipment may be orientated in a plurality of positions about said second axis to monitor the radioactivity from material passed through said frame.

4. A mobile support frame as set forth in claim 3 further characterized by said detector mount being rotatable about a third axis disposed in spaced parallel relationship with respect to said second axis such that the radiation detector equipment may be oriented in a plurality of positions about said third axis to monitor the radioactivity from material passed through said frame.

5. A mobile support frame as set forth in claim 4 further characterized by including a plurality of detector mounts movably supported along and about said support members and by said support members being telescopically adjustable such that the height of the mobile support frame may be adjusted to accommodate waste as it is passed through said frame.

6. A mobile support frame as set forth in claim 5 further characterized by said cross member being telescopically adjustable such that the distance between said support members may be adjusted.

7. A mobile support frame as set forth in claim 6 further characterized by a pair of castors mounted on each of said base members and adapted for rolling contact with a floor surface such that the support frame may be easily moved.

8. A mobile support frame as set forth in claim 7 further characterized by a control box secured to said cross member for housing radiation monitoring equipment, said control box being sealed on five sides and having a clear cover removably disposed over the open sixth side to allow inspection, but not tampering, of the monitoring equipment.

9. A mobile support frame as set forth in claim 8, said frame further characterized by including a pair of upper detector mounts and a pair of lower detector mounts, radiation detector probes operatively mounted on said upper and lower detector mounts, each of said mounts movably supported along said pair of support members and rotatable about an axis perpendicular to said support members to orientate said probes to detect radiation from material passed through said frame.

* * * * *